United States Patent
Wang et al.

(10) Patent No.: US 11,228,179 B2
(45) Date of Patent: Jan. 18, 2022

(54) DECOMPOSITION-COORDINATION VOLTAGE CONTROL METHOD FOR WIND POWER TO BE TRANSMITTED TO NEARBY AREA VIA FLEXIBLE DC

(71) Applicants: TSINGHUA UNIVERSITY, Beijing (CN); STATE GRID BEIJING ELECTRIC POWER COMPANY, Beijing (CN); STATE GRID JIBEI ELECTRIC POWER COMPANY, Beijing (CN)

(72) Inventors: Bin Wang, Beijing (CN); Hongquan Ji, Beijing (CN); Yanling Du, Beijing (CN); Qinglai Guo, Beijing (CN); Xijuan Yu, Beijing (CN); Haitao Liu, Beijing (CN); Hongbin Sun, Beijing (CN); Guannan Wang, Beijing (CN); Mang Jiang, Beijing (CN); Huaichang Ge, Beijing (CN); Wenchuan Wu, Beijing (CN)

(73) Assignees: TSINGHUA UNIVERSITY, Beijing (CN); STATE GRID BEIJING ELECTRIC POWER COMPANY, Beijing (CN); STATE GRID JIBEI ELECTRIC POWER COMPANY, Beijing (CN)

( * ) Notice: Subject to any disclaimer, the term of this patent is extended or adjusted under 35 U.S.C. 154(b) by 168 days.

(21) Appl. No.: 16/848,654

(22) Filed: Apr. 14, 2020

(65) Prior Publication Data

US 2021/0119453 A1 Apr. 22, 2021

(30) Foreign Application Priority Data

Oct. 17, 2019 (CN) .......................... 201910987071.8

(51) Int. Cl.
*H02J 3/38* (2006.01)
*F03D 7/04* (2006.01)
*H02P 9/04* (2006.01)
*H02P 101/15* (2016.01)

(52) U.S. Cl.
CPC .............. *H02J 3/381* (2013.01); *F03D 7/047* (2013.01); *F03D 7/048* (2013.01); *H02P 9/04* (2013.01); *H02J 2300/28* (2020.01); *H02P 2101/15* (2015.01)

(58) Field of Classification Search
CPC .......... H02J 3/38; H02J 3/381; H02J 2300/28; F03D 7/047; F03D 7/048; H02P 9/04; H02P 2101/15
See application file for complete search history.

*Primary Examiner* — Robert L Deberadinis
(74) *Attorney, Agent, or Firm* — Hodgson Russ LLP

(57) ABSTRACT

The present disclosure proposes a decomposition-coordination voltage control method for wind power to be transmitted to a nearby area via flexible DC. The method includes: initializing parameters; sending the parameters to wind power farms; for each of the wind power farms, establishing a voltage control optimization sub-model; solving the voltage control optimization sub-model to obtain a first optimal result; for the control center, establishing a voltage control optimization main model; solving the voltage control optimization main model to obtain a second optimal result; calculating a determination index based on the first optimal result and the second optimal result; and determining whether the determination index is convergent to an admissible value, if no, updating the parameters and returning to establishing the voltage control optimization sub-model.

13 Claims, No Drawings

DECOMPOSITION-COORDINATION VOLTAGE CONTROL METHOD FOR WIND POWER TO BE TRANSMITTED TO NEARBY AREA VIA FLEXIBLE DC

CROSS-REFERENCE TO RELATED APPLICATION

The present application is based upon and claims priority to Chinese Patent Application No. 201910987071.8, filed Oct. 17, 2019, the entire disclosure of which is incorporated herein by reference.

FIELD

The present disclosure relates to a decomposition-coordination voltage control method for wind power to be transmitted to a nearby area via flexible DC, which belongs to a technical field of voltage control for a power system.

BACKGROUND

Due to the geographical distribution of wind power resources in China, large-scale cluster wind power often needs to be delivered to the load area over a long distance. Flexible direct current (DC) has become a new choice of power transmission methods with its technical advantages, providing flexible voltage support for transmitting wind power to a nearby area (via a large-scale flexible DC grid-connected wind power collection area). However, there are dozens of wind power farms for transmitting wind power to the nearby area via flexible DC, and there are dozens or hundreds of wind turbines in each wind power farm. In order to achieve coordinated voltage control, it is necessary to sense state parameters of each wind turbine and send it to the control center, which causes a large scale of the control problem and heavy communication burden. Therefore, the traditional centralized voltage control method is difficult to achieve real-time coordinated voltage control.

SUMMARY

The present disclosure aims at overcoming shortcomings of the prior art, and proposes a decomposition-coordination voltage control method for wind power to be transmitted to a nearby area via flexible DC.

The decomposition-coordination voltage control method for wind power to be transmitted to a nearby area via flexible DC proposed by the present disclosure includes: initializing parameters comprising the number of iterations, a set value of a flexible direct voltage issued by a control center, a primary penalty coefficient and a secondary penalty coefficient; sending the parameters to wind power farms, wherein the wind power farms comprises equivalent wind power farms and wind power farms directly connected to the flexible DC, and the equivalent wind power farms are equivalent to wind power farms connected to the flexible DC via a collection station; for each of the wind power farms, establishing a voltage control optimization sub-model based on a value of voltage at each node in the wind power farm, a set value of the voltage at each node in the wind power farm, a set value of a flexible direct voltage required in the wind power farm; solving the voltage control optimization sub-model to obtain a first optimal result; for the control center, establishing a voltage control optimization main model based on the first optimal result, the primary penalty coefficient and the secondary penalty coefficient; solving the voltage control optimization main model to obtain a second optimal result; calculating a determination index based on the first optimal result and the second optimal result; and determining whether the determination index is convergent to an admissible value, if no, updating the parameters and returning to establishing the voltage control optimization sub-model.

DETAILED DESCRIPTION

The decomposition-coordination voltage control method for wind power to be transmitted to a nearby area via flexible DC provided by the present disclosure is described in detail below with reference to specific embodiments.

The decomposition-coordination voltage control method for wind power to be transmitted to a nearby area via flexible DC according to the present disclosure will be described as follows:

(1) Wind power farms connected to the flexible DC via a collection station is equivalent to equivalent wind power farms, and each equivalent wind power farm and each wind power farm directly connected to the flexible DC are used as individuals to independently solve the voltage control problem. A control center initializes parameters of the decomposition-coordination voltage control problem and send the same to each wind power farm, which is represented by:

$$l=1$$

$$V_{vsc}^{\,l}=1,$$

$$\alpha_w^{\,l}=\beta_w^{\,l}$$

where $l$ represents the number of iterations, $V_{vsc}^{\,l}$ represents a set value of a flexible direct voltage issued by the control center at the $l^{th}$ iteration, $\alpha_w^{\,l}$ and $\beta_w^{\,l}$ represent a primary penalty coefficient and a secondary penalty coefficient of decomposition and coordination for the $w^{th}$ wind power farm at the $l^{th}$ iteration respectively, which may be 0.02.

(2) A corresponding voltage control optimization sub-problem is established for each wind power farm (including each equivalent wind power farm and each wind power farm directly connected to the flexible DC), which is described in detail as follows.

(2-1) An objective function of the optimization sub-problem for the $w^{th}$ wind power farm, which is represented by:

$$\min \sum_{i=1}^{N_w} (V_{i,w} - V_{i,w}^{ref})^2 + \alpha_w^l (V_{vsc,w} - V_{vsc}^l) + \beta_w^l (V_{vsc,w} - V_{vsc}^l)^2,$$

where $V_{i,w}$ represents a value of voltage at the $i^{th}$ node in the $w^{th}$ wind power farm, $V_{i,w}^{ref}$ represents a set value of the voltage at the $i^{th}$ node in the $w^{th}$ wind power farm, which is set by operating staffs in each wind power farm, $N_w$ represents the number of nodes in the $w^{th}$ wind power farm, and $V_{vsc,w}$ represents a set value of a flexible direct voltage required in the $w^{th}$ wind power farm.

This objective function aims at obtaining a minimum deviation between the voltage value at each node in the respective wind power farms, and a minimum deviation between the set value of the flexible direct voltage required by the wind power farm and a set value issued by the control center.

(2-2) Constraints for the optimization sub-problem for the $w^{th}$ wind power farm are established, including an equation constraint for a node voltage, an equation constraint for active power produced by the flexible DC, an equation constraint for reactive power produced by the flexible DC, an adjustment constraint for wind turbines in the wind power farm, an adjustment constraint for reactive power compensation devices in the wind power farm, an adjustment constraint for the flexible direct voltage, and a constraint for node voltage security.

(2-2-1) The equation constraint for a node voltage is represented by:

$$V_{i,w} = V_{i,w}^0 + \Delta V_{i,w}$$

$$\Delta V_{i,w} = \frac{\partial V_{i,w}}{\partial P_{s,w}} \Delta P_{s,w} + \frac{\partial V_{i,w}}{\partial Q_{s,w}} \Delta Q_{s,w} + \frac{\partial V_{i,w}}{\partial Q_{c,w}} \Delta Q_{c,w} + \frac{\partial V_{i,w}}{\partial V_{vsc,w}} \Delta V_{vsc,w},$$

where $V_{i,w}^0$ represents a reference value of the voltage at the $i^{th}$ node in the $w^{th}$ wind power farm, $\Delta V_{i,w}$ represents a change value of the voltage at the $i^{th}$ node in the $w^{th}$ wind power farm, $$\frac{\partial V_{i,w}}{\partial P_{s,w}}$$

represents a sensitivity coefficient of the voltage at the $i^{th}$ node in the $w^{th}$ wind power farm to active power outputted by the $s^{th}$ wind turbine in the $w^{th}$ wind power farm, $$\frac{\partial V_{i,w}}{\partial Q_{s,w}}$$

represents a sensitivity coefficient of the voltage at the $i^{th}$ node in the $w^{th}$ wind power farm to reactive power outputted by the $s^{th}$ wind turbine in the $w^{th}$ wind power farm, $$\frac{\partial V_{i,w}}{\partial Q_{c,w}}$$

represents a sensitivity coefficient of the voltage at the $i^{th}$ node in the $w^{th}$ wind power farm to reactive power outputted by the $c^{th}$ reactive power compensation device in the $w^{th}$ wind power farm, and $$\frac{\partial V_{i,w}}{\partial V_{vsc,w}}$$

represents a sensitivity coefficient of the voltage at the $i^{th}$ node in the $w^{th}$ wind power farm to a set value of a flexible direct voltage required in the $w^{th}$ wind power farm, which are calculated by the respective wind power farms.

(2-2-2) The equation constraint for active power produced by the flexible DC is represented by:

$$P_{vsc,w} = P_{vsc,w}^0 + \Delta P_{vsc,w}$$

$$\Delta P_{vsc,w} = \frac{\partial P_{vsc,w}}{\partial P_{s,w}} \Delta P_{s,w} + \frac{\partial P_{vsc,w}}{\partial Q_{s,w}} \Delta Q_{s,w} + \frac{\partial P_{vsc,w}}{\partial Q_{c,w}} \Delta Q_{c,w} + \frac{\partial P_{vsc,w}}{\partial V_{vsc,w}} \Delta V_{vsc,w},$$

where $P_{vsc,w}$ represents a value of active power produced by flexible DC required in the $w^{th}$ wind power farm, $P_{vsc,w}^0$ represents a reference value of the active power produced by the flexible DC required in the $w^{th}$ wind power farm, $\Delta P_{vsc,w}$ represents a change value of the active power produced by the flexible DC required in the $w^{th}$ wind power farm, $$\frac{\partial P_{vsc,w}}{\partial P_{s,w}}$$

represents a sensitivity coefficient of the value of active power produced by the flexible DC required in the $w^{th}$ wind power farm to the active power outputted by the $s^{th}$ wind turbine in the $w^{th}$ wind power farm, $$\frac{\partial P_{vsc,w}}{\partial Q_{s,w}}$$

represents a sensitivity coefficient of the value of active power produced by the flexible DC required in the $w^{th}$ wind power farm to the reactive power outputted by the $s^{th}$ wind turbine in the $w^{th}$ wind power farm, $$\frac{\partial P_{vsc,w}}{\partial Q_{c,w}}$$

represents a sensitivity coefficient of the value of active power produced by the flexible DC required in the $w^{th}$ wind power farm to reactive power outputted by the $c^{th}$ reactive power compensation device in the $w^{th}$ wind power farm, $$\frac{\partial P_{vsc,w}}{\partial V_{vsc,w}}$$

represents a sensitivity coefficient of the value of active power produced by the flexible DC required in the $w^{th}$ wind power farm to the set value of the flexible direct voltage required in the $w^{th}$ wind power farm, which are calculated by the respective wind power farms.

(2-2-3) The equation constraint for reactive power produced by the flexible DC is represented by:

$$Q_{vsc,w} = Q_{vsc,w}^0 + \Delta Q_{vsc,w}$$

$$\Delta Q_{vsc,w} = \frac{\partial Q_{vsc,w}}{\partial P_{s,w}} \Delta P_{s,w} + \frac{\partial Q_{vsc,w}}{\partial Q_{s,w}} \Delta Q_{s,w} + \frac{\partial Q_{vsc,w}}{\partial Q_{c,w}} \Delta Q_{c,w} + \frac{\partial Q_{vsc,w}}{\partial V_{vsc,w}} \Delta V_{vsc,w},$$

where $Q_{vsc,w}$ represents a value of reactive power produced by flexible DC required in the $w^{th}$ wind power farm, $Q_{vsc,w}^0$ represents a reference value of the reactive power produced by the flexible DC required in the $w^{th}$ wind power farm, $\Delta Q_{vsc,w}$ represents a change value of the reactive power produced by the flexible DC required in the $w^{th}$ wind power farm, $$\frac{\partial Q_{vsc,w}}{\partial P_{s,w}}$$

represents a sensitivity coefficient of the value of reactive power produced by the flexible DC required in the $w^{th}$ wind power farm to the active power outputted by the $s^{th}$ wind turbine in the $w^{th}$ wind power farm, $$\frac{\partial Q_{vsc,w}}{\partial Q_{s,w}}$$

represents a sensitivity coefficient of the value of reactive power produced by the flexible DC required in the $w^{th}$ wind power farm to the reactive power outputted by the $s^{th}$ wind turbine in the $w^{th}$ wind power farm, and $$\frac{\partial Q_{vsc,w}}{\partial Q_{c,w}}$$

represents a sensitivity coefficient of the value of reactive power produced by the flexible DC required in the $w^{th}$ wind power farm to reactive power outputted by the $c^{th}$ reactive power compensation device in the $w^{th}$ wind power farm, and $$\frac{\partial Q_{vsc,w}}{\partial V_{vsc,w}}$$

represents a sensitivity coefficient of the value of reactive power produced by the flexible DC required in the $w^{th}$ wind power farm to the set value of the flexible direct voltage required in the $w^{th}$ wind power farm, which are calculated by the respective wind power farms.

(2-2-4) The adjustment constraint for wind turbines in the wind power farm is represented by:

$$\underline{Q_{s,w}} \leq Q_{s,w} \leq \overline{Q_{s,w}},$$

where $\underline{Q_{s,w}}$ and $\overline{Q_{s,w}}$ represent a lower limit and an upper limit of reactive power outputted by the $s^{th}$ wind turbine in the $w^{th}$ wind power farm respectively.

(2-2-5) The adjustment constraint for reactive power compensation devices in the wind power farm is represented by:

$$\underline{Q_{c,w}} \leq Q_{c,w} \leq \overline{Q_{c,w}}$$

where $\underline{Q_{c,w}}$ and $\overline{Q_{c,w}}$ represent a lower limit and an upper limit of reactive power outputted by the $c^{th}$ reactive power compensation device in the $w^{th}$ wind power farm respectively.

(2-2-6) The adjustment constraint for the flexible direct voltage is represented by:

$$\underline{V_{vsc}} \leq V_{vsc,w} \leq \overline{V_{vsc}},$$

where $\underline{V_{vsc}}$ and $\overline{V_{vsc}}$ represent a lower limit and an upper limit of the set value of the flexible direct voltage respectively.

(2-2-7) The constraint for node voltage security is represented by:

$$\underline{V_{i,w}} \leq V_{i,w} \leq \overline{V_{i,w}},$$

where $\underline{V_{i,w}}$ and $\overline{V_{i,w}}$ represent a lower limit and an upper limit of the voltage at the $i^{th}$ node in the $w^{th}$ wind power farm respectively.

(3) For respective wind power farms, corresponding voltage control optimization sub-problems established at step S2 are solved in parallel, and optimal solutions $V^*_{vsc,w}$, $P^*_{vsc,w}$ and $V^*_{vsc,w}$ for each wind power farm are obtained and sent to the control center, where $V^*_{vsc,w}$ represents an optimal set value of the flexible direct voltage required in the $w^{th}$ wind power farm, $P^*_{vsc,w}$ represents an optimal value of active power produced by flexible DC required in the $w^{th}$ wind power farm, and $Q^*_{vsc,w}$ represents an optimal value of reactive power produced by flexible DC required in the $w^{th}$ wind power farm.

(4) The control center establishes an optimization main problem for voltage coordination, which is described in followings.

(4-1) An objective function of the optimization main problem is established, which is represented by:

$$\min \sum_{w=1}^{N} \left[ \alpha_w^I (V_{vsc,w}^* - V_{vsc}) + \beta_w^I (V_{vsc,w}^* - V_{vsc})^2 \right],$$

where N represents the number of wind power farms independently solving the sub-problem, and $V_{vsc}$ represents a set value of the flexible direct voltage determined by the control center.

This objective function aims at obtaining a minimum deviation between the set value of the flexible direct voltage determined by the control center and the set value required by the respective wind power farms.

(4-2) Constraints for the optimization main problem are determined, including: an adjustment constraint for the flexible direct voltage, an adjustment constraint for active power of the flexible DC, an adjustment constraint for reactive power of the flexible DC.

(4-2-1) The adjustment constraint for the flexible direct voltage is represented by:

$$\underline{V_{vsc}} \leq V_{vsc} \leq \overline{V_{vsc}}.$$

(4-2-2) The adjustment constraint for active power of the flexible DC is represented by:

$$\underline{P_{vsc}} \leq \sum_{w=1}^{N} \left[ P_{vsc,w} + \frac{\partial P_{vsc,w}}{\partial V_{vsc,w}} (V_{vsc} - V_{vsc,w}^*) \right] \leq \overline{P_{vsc}},$$

where $\underline{P_{vsc}}$ and $\overline{P_{vsc}}$ represent a lower limit and an upper limit of active power produced by the flexible DC respectively.

(4-2-3) The adjustment constraint for reactive power of the flexible DC is represented by:

$$\underline{Q_{vsc}} \leq \sum_{w=1}^{N} \left[ Q_{vsc,w} + \frac{\partial Q_{vsc,w}}{\partial V_{vsc,w}} (V_{vsc} - V_{vsc,w}^*) \right] \leq \overline{Q_{vsc}},$$

where $Q_{vsc}$ and $\overline{Q_{vsc}}$ represent a lower limit and an upper limit of active power produced by the flexible DC respectively.

(5) The control center solves the established optimization main problem which is described in section (4), and obtains the optimal solutions $V^*_{vsc}$, in which $V^*_{vsc}$ represents an optimal set value of the flexible direct voltage determined by the control center.

(6) The control center performs convergence determination of the optimization problem for voltage control coordination, and the determination index $\varepsilon$ is calculated by:

$$\varepsilon = \frac{1}{N}\sum_{w=1}^{N}|V^*_{vsc,w} - V^*_{vsc}|.$$

$\varepsilon^{tol}$ is set as an admissible value of the determination index set by the control center, which may be 0.001. If $\varepsilon > \varepsilon^{tol}$, it means that convergence has not been reached, then proceed to section (7); if $\varepsilon \leq \varepsilon^{tol}$, it means that convergence has been reached, then the current optimal set value $V^*_{vsc}$ of the flexible direct voltage is regarded as the reference value finally issued to a flexible DC controller, at the same time, the control center notifies the respective wind power farms that the calculation reaches convergence, and for each wind power farm, the optimal result of the current sub-problem is regarded as the reference value of an internal wind turbine and a dynamic reactive power compensation device in this wind power farm, and the method ends.

(7) The control center updates parameters and sends the same to each wind power farm, which is represented by:

$l=l+1$ $V_{vsc}^{l}=V^*_{vsc}$ $\alpha_w^l = \alpha_w^{l-1} + 2(\beta_w^{l-1})^2(V^*_{vsc} - V^*_{vsc,w})'$ $\beta_w^l = \gamma \beta_w^{l-1}$ where $\alpha_w^{l-1}$ and $\beta_w^{l-1}$ represent a primary penalty coefficient and a secondary penalty coefficient of decomposition and coordination for the $w^{th}$ wind power farm at the (l–1)th iteration, respectively, and $\gamma$ represents an acceleration factor of decomposition and coordination, which is set by the control center, and the value of which is greater than 1.

Then the method returns to section (2) to start a next iteration.

The decomposition-coordination voltage control method for wind power to be transmitted to a nearby area via flexible DC provided by the present disclosure has the following advantages.

The present disclosure transforms the decomposition-coordination voltage control problem for wind power to be transmitted to a nearby area via flexible DC into independent sub-problems at the wind power farm level and a coordination main problem at the control center level. Each wind power farm may solve the sub-problem independently and in parallel, and only electric parameters related to the flexible DC are interacted between each wind power farm and the control center, thereby reducing the optimization problem scale and communication burden of coordination control. When the iterative process is converged, the optimal solution of the coordination voltage control problem can be obtained, that is, the set values of reactive voltage in each wind power farm are comprehensively coordinated, ensuring the safe operation of the wind power to be transmitted to the nearby area via the flexible DC.

In this method, wind power farms connected to the flexible DC via a collection station is equivalent to equivalent wind power farms, and each equivalent wind power farm and each wind power farm directly connected to the flexible DC are used as individuals to independently solve the voltage control problem. For each iteration, a corresponding voltage control optimization sub-problem is established and solved for each wind power farm, and the results are sent to a control center. The control center establishes and solves an optimization main problem for voltage coordination, and performs convergence determination on the result. If the result is converged, a reference value of the flexible DC controller and a reference value of an internal wind turbine and a dynamic reactive power compensation device in each wind power farm. The present disclosure reduces the scale of the control problem and the communication burden, ensuring the optimal result of the voltage control optimization, thereby realizing the safe operation of the wind power to be transmitted to the nearby area via the flexible DC.

The decomposition-coordination voltage control method for wind power to be transmitted to a nearby area via flexible DC provided by the present disclosure has the following advantages.

The present disclosure transforms and decomposes the decomposition-coordination voltage control problem for wind power to be transmitted to a nearby area via flexible DC into independent sub-problems at the wind power farm level and a coordination main problem at the control center level. Each wind power farm may solve the sub-problem independently and in parallel, and only electric parameters related to the flexible DC are interacted between each wind power farm and the control center in the iteration, thereby reducing the optimization problem scale and communication burden of coordination control. When the iterative process is converged, the optimal solution of the coordination voltage control problem can be obtained, that is, the set values of reactive voltage in each wind power farm are comprehensively coordinated, ensuring the safe operation of the wind power to be transmitted to the nearby area via the flexible DC.

What is claimed is:

1. A decomposition-coordination voltage control method for wind power to be transmitted to a nearby area via flexible DC, comprising:
    initializing parameters comprising the number of iterations, a set value of a flexible direct voltage issued by a control center, a primary penalty coefficient and a secondary penalty coefficient;
    sending the parameters to wind power farms, wherein the wind power farms comprises equivalent wind power farms and wind power farms directly connected to the flexible DC, and the equivalent wind power farms are equivalent to wind power farms connected to the flexible DC via a collection station;
    for each of the wind power farms, establishing a voltage control optimization sub-model based on a value of voltage at each node in the wind power farm, a set value of the voltage at each node in the wind power farm, a set value of a flexible direct voltage required in the wind power farm;
    solving the voltage control optimization sub-model to obtain a first optimal result;

for the control center, establishing a voltage control optimization main model based on the first optimal result, the primary penalty coefficient and the secondary penalty coefficient;

solving the voltage control optimization main model to obtain a second optimal result;

calculating a determination index based on the first optimal result and the second optimal result; and determining whether the determination index is convergent to an admissible value, if no, updating the parameters and returning to establishing the voltage control optimization sub-model.

2. The method of claim 1, wherein initializing the parameters comprising the number of iterations, a set value of a flexible direct voltage issued by a control center, a primary penalty coefficient and a secondary penalty coefficient comprises:

initializing the parameters by:

$$l=1$$

$$V_{vsc}^{l}=1,$$

$$\alpha_w^l = \beta_w^l$$

where l represents the number of iterations, $V_{vsc}^{l}$ represents a set value of a flexible direct voltage issued by the control center at the $l^{th}$ iteration, $\alpha_w^l$ and $\beta_w^l$ represent a primary penalty coefficient and the secondary penalty coefficient for the $w^{th}$ wind power farm at the $l^{th}$ iteration respectively.

3. The method of claim 2, wherein for each of the wind power farms, establishing the voltage control optimization sub-model comprises:

establishing an objective function for the $w^{th}$ wind power farm, which is represented by:

$$\min \sum_{i=1}^{N_w} (V_{i,w} - V_{i,w}^{ref})^2 + \alpha_w^l (V_{vsc,w} - V_{vsc}^l) + \beta_w^l (V_{vsc,w} - V_{vsc}^l)^2,$$

where $V_{i,w}$ represents a value of voltage at the $i^{th}$ node in the $w^{th}$ wind power farm, $V_{i,w}^{ref}$ represents a set value of the voltage at the $i^{th}$ node in the $w^{th}$ wind power farm, $N_w$ represents the number of nodes in the $w^{th}$ wind power farm, and $V_{vsc,w}$ represents a set value of a flexible direct voltage required in the $w^{th}$ wind power farm.

4. The method of claim 3, wherein for each of the wind power farms, establishing the voltage control optimization sub-model comprises:

establishing constraints for the $w^{th}$ wind power farm, comprising an equation constraint for a node voltage, an equation constraint for active power produced by the flexible DC, an equation constraint for reactive power produced by the flexible DC, an adjustment constraint for wind turbines in the wind power farm, an adjustment constraint for reactive power compensation devices in the wind power farm, an adjustment constraint for the flexible direct voltage, and a constraint for node voltage security, wherein, the equation constraint for a node voltage is represented by:

$$V_{i,w} = V_{i,w}^0 + \Delta V_{i,w}$$

$$\Delta V_{i,w} = \frac{\partial V_{i,w}}{\partial P_{s,w}} \Delta P_{s,w} + \frac{\partial V_{i,w}}{\partial Q_{s,w}} \Delta Q_{s,w} + \frac{\partial V_{i,w}}{\partial Q_{c,w}} \Delta Q_{c,w} + \frac{\partial V_{i,w}}{\partial V_{vsc,w}} \Delta V_{vsc,w},$$

where $V_{i,w}^0$ represents a reference value of the voltage at the $i^{th}$ node in the $w^{th}$ wind power farm, $\Delta V_{i,w}$ represents a change value of the voltage at the $i^{th}$ node in the $w^{th}$ wind power farm, $$\frac{\partial V_{i,w}}{\partial P_{s,w}}$$

represents a sensitivity coefficient of the voltage at the $i^{th}$ node in the $w^{th}$ wind power farm to active power outputted by the $s^{th}$ wind turbine in the $w^{th}$ wind power farm, $$\frac{\partial V_{i,w}}{\partial Q_{s,w}}$$

represents a sensitivity coefficient of the voltage at the $i^{th}$ node in the $w^{th}$ wind power farm to reactive power outputted by the $s^{th}$ wind turbine in the $w^{th}$ wind power farm, $$\frac{\partial V_{i,w}}{\partial Q_{c,w}}$$

represents a sensitivity coefficient of the voltage at the $i^{th}$ node in the $w^{th}$ wind power farm to reactive power outputted by the $c^{th}$ reactive power compensation device in the $w^{th}$ wind power farm, and $$\frac{\partial V_{i,w}}{\partial V_{vsc,w}}$$

represents a sensitivity coefficient of the voltage at the $i^{th}$ node in the $w^{th}$ wind power farm to the set value of the flexible direct voltage required in the $w^{th}$ wind power farm;

the equation constraint for active power produced by the flexible DC is represented by:

$$P_{vsc,w} = P_{vsc,w}^0 + \Delta P_{vsc,w}$$

$$\Delta P_{vsc,w} = \frac{\partial P_{vsc,w}}{\partial P_{s,w}} \Delta P_{s,w} + \frac{\partial P_{vsc,w}}{\partial Q_{s,w}} \Delta Q_{s,w} + \frac{\partial P_{vsc,w}}{\partial Q_{c,w}} \Delta Q_{c,w} + \frac{\partial P_{vsc,w}}{\partial V_{vsc,w}} \Delta V_{vsc,w},$$

where $P_{vsc,w}$ represents a value of active power produced by flexible DC required in the $w^{th}$ wind power farm, $P_{vsc,w}^0$ represents a reference value of the active power produced by the flexible DC required in the $w^{th}$ wind power farm, $\Delta P_{vsc,w}$ represents a change value of the active power produced by the flexible DC required in the $w^{th}$ wind power farm, $$\frac{\partial P_{vsc,w}}{\partial P_{s,w}}$$

represents a sensitivity coefficient of the value of active power produced by the flexible DC required in the $w^{th}$ wind power farm to the active power outputted by the $s^{th}$ wind turbine in the $w^{th}$ wind power farm, $$\frac{\partial P_{vsc,w}}{\partial Q_{s,w}}$$

represents a sensitivity coefficient of the value of active power produced by the flexible DC required in the $w^{th}$ wind power farm to the reactive power outputted by the $s^{th}$ wind turbine in the $w^{th}$ wind power farm, $$\frac{\partial P_{vsc,w}}{\partial Q_{c,w}}$$

represents a sensitivity coefficient of the value of active power produced by the flexible DC required in the $w^{th}$ wind power farm to reactive power outputted by the $c^{th}$ reactive power compensation device in the $w^{th}$ wind power farm, $$\frac{\partial P_{vsc,w}}{\partial V_{vsc,w}}$$

represents a sensitivity coefficient of the value of active power produced by the flexible DC required in the $w^{th}$ wind power farm to the set value of the flexible direct voltage required in the $w^{th}$ wind power farm;

the equation constraint for reactive power produced by the flexible DC is represented by:

$$Q_{vsc,w} = Q^0_{vsc,w} + \Delta Q_{vsc,w}$$

$$\Delta Q_{vsc,w} = \frac{\partial Q_{vsc,w}}{\partial Q_{s,w}}\Delta P_{s,w} + \frac{\partial Q_{vsc,w}}{\partial Q_{s,w}}\Delta Q_{s,w} + \frac{\partial Q_{vsc,w}}{\partial Q_{c,w}}\Delta Q_{c,w} + \frac{\partial Q_{vsc,w}}{\partial V_{vsc,w}}\Delta V_{vsc,w},$$

where $Q_{vsc,w}$ represents a value of reactive power produced by flexible DC required in the $w^{th}$ wind power farm, $Q_{vsc,w}^0$ represents a reference value of the reactive power produced by the flexible DC required in the $w^{th}$ wind power farm, $\Delta Q_{vsc,w}$ represents a change value of the reactive power produced by the flexible DC required in the $w^{th}$ wind power farm, $$\frac{\partial Q_{vsc,w}}{\partial P_{s,w}}$$

represents a sensitivity coefficient of the value of reactive power produced by the flexible DC required in the $w^{th}$ wind power farm to the active power outputted by the $s^{th}$ wind turbine in the $w^{th}$ wind power farm, $$\frac{\partial Q_{vsc,w}}{\partial Q_{s,w}}$$

represents a sensitivity coefficient of the value of reactive power produced by the flexible DC required in the $w^{th}$ wind power farm to the reactive power outputted by the $s^{th}$ wind turbine in the $w^{th}$ wind power farm, and $$\frac{\partial Q_{vsc,w}}{\partial Q_{c,w}}$$

represents a sensitivity coefficient of the value of reactive power produced by the flexible DC required in the $w^{th}$ wind power farm to reactive power outputted by the $c^{th}$ reactive power compensation device in the $w^{th}$ wind power farm, and $$\frac{\partial Q_{vsc,w}}{\partial V_{vsc,w}}$$

represents a sensitivity coefficient of the value of reactive power produced by the flexible DC required in the $w^{th}$ wind power farm to the set value of the flexible direct voltage required in the $w^{th}$ wind power farm;

the adjustment constraint for wind turbines in the wind power farm is represented by:

$$\underline{Q_{s,w}} \leq Q_{s,w} \leq \overline{Q_{s,w}},$$

where $\underline{Q_{s,w}}$ and $\overline{Q_{s,w}}$ represent a lower limit and an upper limit of reactive power outputted by the $s^{th}$ wind turbine in the $w^{th}$ wind power farm respectively;

the adjustment constraint for reactive power compensation devices in the wind powerfarm is represented by:

$$\underline{Q_{c,w}} \leq Q_{c,w} \leq \overline{Q_{c,w}},$$

where $\underline{Q_{c,w}}$ and $\overline{Q_{c,w}}$ represent a lower limit and an upper limit of reactive power outputted by the $c^{th}$ reactive power compensation device in the $w^{th}$ wind power farm respectively;

the adjustment constraint for the flexible direct voltage is represented by:

$$\underline{V_{vsc}} \leq V_{vsc,w} \leq \overline{V_{vsc}},$$

where $\underline{V_{vsc}}$ and $\overline{V_{vsc}}$ represent a lower limit and an upper limit of the set value of the flexible direct voltage respectively; and the constraint for node voltage security is represented by:

$$\underline{V_{i,w}} \leq V_{i,w} \leq \overline{V_{i,w}},$$

where $\underline{V_{i,w}}$ and $\overline{V_{i,w}}$ represent a lower limit and an upper limit of the voltage at the $i^{th}$ node in the $w^{th}$ wind power farm respectively.

5. The method of claim 4, wherein the first optimal result comprises an optimal set value $V^*_{vsc,w}$ of the flexible direct voltage required in the $w^{th}$ wind power farm, an optimal value $P^*_{vsc,w}$ of active power produced by flexible DC required in the $w^{th}$ wind power farm, and an optimal value $Q^*_{vsc,w}$ of reactive power produced by flexible DC required in the $w^{th}$ wind power farm.

6. The method of claim 5, further comprising:
sending the first optimal result to the control center.
7. The method of claim 6, wherein for the control center, establishing the voltage control optimization main model comprises:
establishing an objective function of the voltage control optimization main model, which is represented by:

$$\min \sum_{w=1}^{N} \left[ \alpha_w^l (V_{vsc,w}^* - V_{vsc}) + \beta_w^l (V_{vsc,w}^* - V_{vsc})^2 \right],$$

where N represents the number of the wind power farms, and $V_{vsc}$ represents a set value of the flexible direct voltage determined by the control center.

8. The method of claim 7, wherein for the control center, establishing the voltage control optimization main model comprises:
establishing constraints for the voltage control optimization main model, comprising: an adjustment constraint for the flexible direct voltage, an adjustment constraint for active power of the flexible DC, and an adjustment constraint for reactive power of the flexible DC, wherein,
the adjustment constraint for the flexible direct voltage is represented by:

$$\underline{V_{vsc}} \leq V_{vsc} \leq \overline{V_{vsc}};$$

the adjustment constraint for active power of the flexible DC is represented by:

$$\underline{P_{vsc}} \leq \sum_{w=1}^{N} \left[ P_{vsc,w} + \frac{\partial P_{vsc,w}}{\partial V_{vsc,w}} (V_{vsc} - V_{vsc,w}^*) \right] \leq \overline{P_{vsc}},$$

where $\underline{P_{vsc}}$ and $\overline{P_{vsc}}$ represent a lower limit and an upper limit of active power produced by the flexible DC respectively; and
the adjustment constraint for reactive power of the flexible DC is represented by:

$$\underline{Q_{vsc}} \leq \sum_{w=1}^{N} \left[ Q_{vsc,w} + \frac{\partial Q_{vsc,w}}{\partial V_{vsc,w}} (V_{vsc} - V_{vsc,w}^*) \right] \leq \overline{Q_{vsc}},$$

where $\underline{Q_{vsc}}$ and $\overline{Q_{vsc}}$ represent a lower limit and an upper limit of active power produced by the flexible DC respectively.

9. The method of claim 8, wherein the second optimal result comprises an optimal set value $V^*_{vsc}$ of the flexible direct voltage determined by the control center.

10. The method of claim 9, wherein calculating the determination index based on the first optimal result and the second optimal result comprises:
calculating the determination index by:

$$\varepsilon = \frac{1}{N} \sum_{w=1}^{N} |V_{vsc,w}^* - V_{vsc}^*|,$$

where $\varepsilon$ represents the determination index.

11. The method of claim 10, wherein the admissible value is represented by $\varepsilon^{tol}$, which is set by the control center, and
determining whether the determination index is convergent to the admissible value comprises:
when $\varepsilon > \varepsilon^{tol}$, determining that the determination index is not convergent to the admissible value; when $\varepsilon \leq \varepsilon^{tol}$, determining that the determination index is convergent to the admissible value.

12. The method of claim 11, wherein when the determination index is not convergent to the admissible value, updating the parameters and returning to establishing the voltage control optimization sub-model comprises:
updating the parameters by:

$$l = l+1$$

$$V_{vsc}^l = V^*_{vsc}$$

$$\alpha_w^l = \alpha_w^{l-1} + 2(\beta_w^{l-1})^2 (V^*_{vsc} - V^*_{vsc,w})'$$

$$\beta_w^l = \gamma \beta_w^{l-1}$$

where $\alpha_w^{l-1}$ and $\beta_w^{l-1}$ represent a primary penalty coefficient and a secondary penalty coefficient for the $w^{th}$ wind power farm at the $(l-1)^{th}$ iteration, respectively, and $\gamma$ represents an acceleration factor set by the control center, and
returning to establishing the voltage control optimization sub-model.

13. The method of claim 11, wherein when the determination index is convergent to the admissible value, determining the optimal set value $V^*_{vsc}$ of the flexible direct voltage as a reference value finally issued to a flexible DC controller, and for each wind power farm, determining the first optimal result as a reference value of an internal wind turbine and a dynamic reactive power compensation device in the wind power farm.

* * * * *